US012673696B2

(12) United States Patent
Hong

(10) Patent No.: US 12,673,696 B2
(45) Date of Patent: Jul. 7, 2026

(54) DATA STORAGE SYSTEM FOR AUTOMATED DRIVING, OPERATION METHOD OF DATA STORAGE SYSTEM FOR AUTOMATED DRIVING, AND OPERATION METHOD OF SYSTEM

(71) Applicant: SAMSUNG ELECTRONICS CO., LTD., Suwon-si (KR)

(72) Inventor: Won-Gi Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 18/368,880

(22) Filed: Sep. 15, 2023

(65) Prior Publication Data

US 2024/0116541 A1    Apr. 11, 2024

(30) Foreign Application Priority Data

Oct. 6, 2022    (KR) ........................ 10-2022-0127969

(51) Int. Cl.
*B60W 60/00*        (2020.01)
*G07C 5/08*        (2006.01)

(52) U.S. Cl.
CPC ....... *B60W 60/0015* (2020.02); *G07C 5/0841* (2013.01); *B60W 2554/4045* (2020.02)

(58) Field of Classification Search
CPC ...... B60W 60/0015; B60W 2554/4045; G07C 5/0841
See application file for complete search history.

(56) References Cited

U.S. PATENT DOCUMENTS

| | | | |
|---|---|---|---|
| 11,321,977 B2 * | 5/2022 | Hansel | ................... G11C 16/10 |
| 2019/0302766 A1 * | 10/2019 | Mondello | ............... G06F 21/64 |
| 2021/0090356 A1 * | 3/2021 | Golov | ...................... H03M 7/70 |
| 2021/0142146 A1 * | 5/2021 | Kale | ................... G06F 13/4282 |
| 2021/0245659 A1 | 8/2021 | Golov | |
| 2022/0014588 A1 * | 1/2022 | Guim Bernat | ...... H04L 67/1097 |
| 2022/0100669 A1 | 3/2022 | Choe et al. | |
| 2022/0197833 A1 | 6/2022 | Steinmetz et al. | |

FOREIGN PATENT DOCUMENTS

| | | |
|---|---|---|
| JP | 2022-78053 A | 5/2022 |
| JP | 7061786 B2 | 5/2022 |
| KR | 10-2012-0092826 A | 8/2012 |

* cited by examiner

*Primary Examiner* — Scott A Browne
*Assistant Examiner* — Izcalli Rios-Aguirre
(74) *Attorney, Agent, or Firm* — Sughrue Mion, PLLC

(57) ABSTRACT

A data storage system for automated driving, includes: a non-volatile memory device; a dedicated memory configured to be managed by an external host as a system memory; an auxiliary power supply configured to provide an auxiliary power; and a storage controller configured to, under control of the external host, store user data in the nonvolatile memory device and store sensor data in the dedicated memory in a ring buffer manner, wherein the storage controller is further configured to, based on a trigger condition being satisfied, flush at least a portion of the sensor data stored in the dedicated memory to the non-volatile memory device by using the auxiliary power.

17 Claims, 10 Drawing Sheets

Address Range
managed by Host add_a ----

UD →

System
Memory
Area
~111 add_b ---- add_c ----

SD →

Dedicated
Memory
Area
~124 add_d ----

Figure 5:
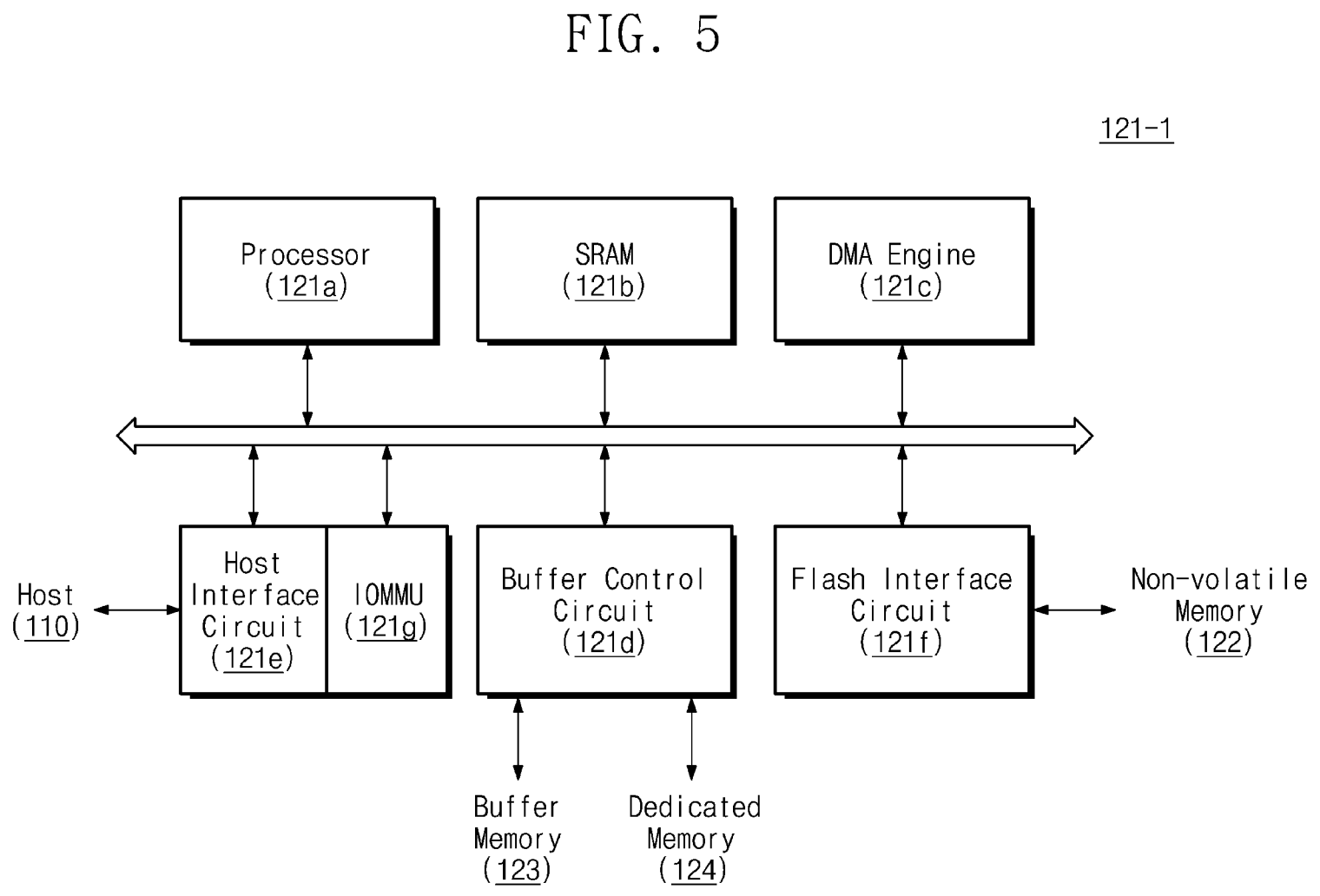

Processor
(121a)

SRAM
(121b)

DMA Engine
(121c)

Host
Interface
Circuit
(121e)

IOMMU
(121g)

Buffer Control
Circuit
(121d)

Flash Interface
Circuit
(121f)

Host
(110)

Buffer
Memory
(123)

Dedicated
Memory
(124)

Non-volatile
Memory
(122)

FIG. 6

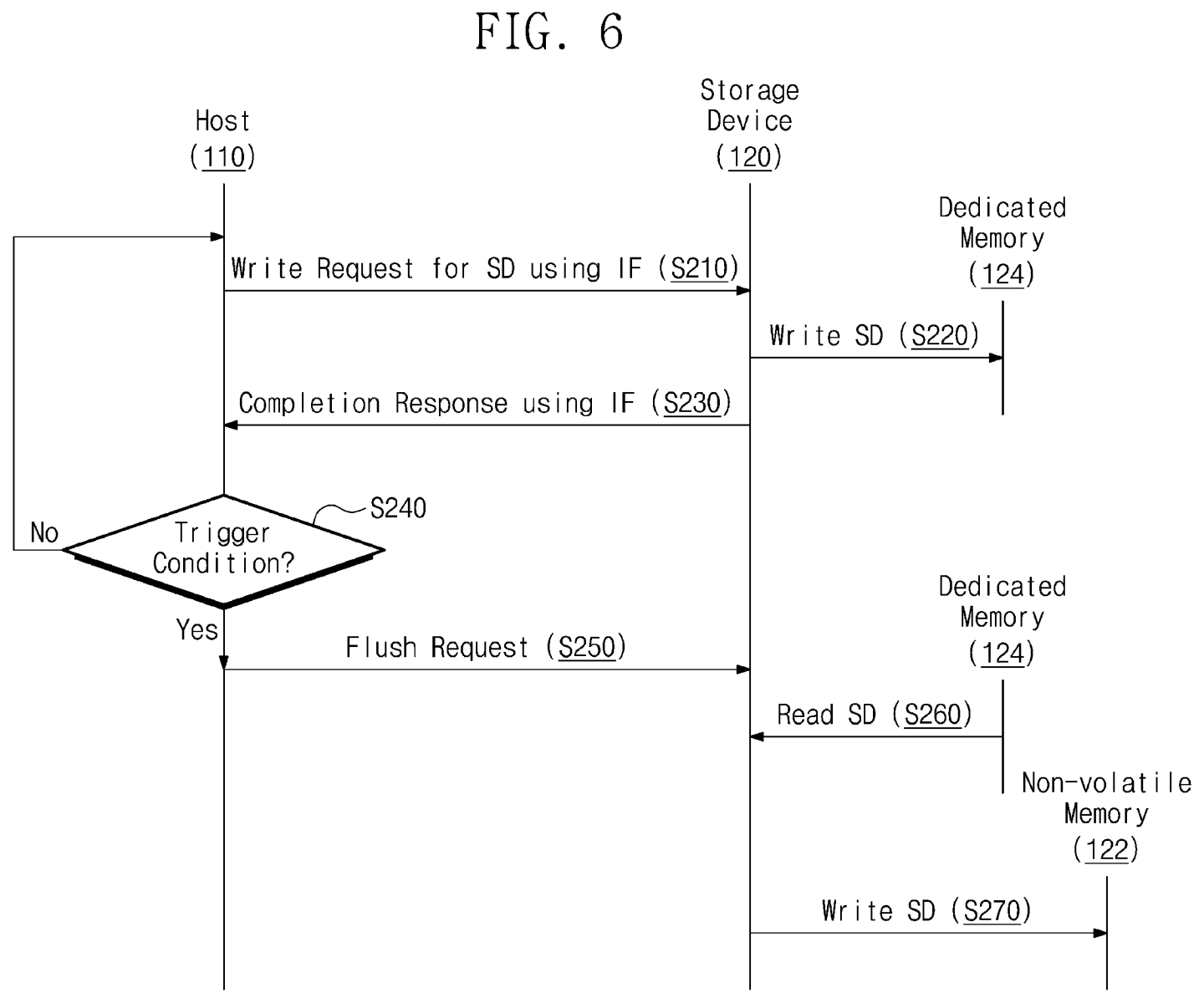

Host
(110)

Storage
Device
(120)

Dedicated
Memory
(124)

Dedicated
Memory
(124)

Non-volatile
Memory
(122)

Write Request for SD using IF (S210)

Write SD (S220)

Completion Response using IF (S230)

S240

Trigger
Condition?

No

Yes

Flush Request (S250)

Read SD (S260)

Write SD (S270)

ADAS Module 2300

Sensor Device 2200

Event Detector 2400

Processor 2100

Storage Device 2500

DATA STORAGE SYSTEM FOR AUTOMATED DRIVING, OPERATION METHOD OF DATA STORAGE SYSTEM FOR AUTOMATED DRIVING, AND OPERATION METHOD OF SYSTEM

CROSS-REFERENCE TO RELATED APPLICATIONS

This application claims priority under 35 U.S.C. § 119 to Korean Patent Application No. 10-2022-0127969, filed on Oct. 6, 2022, in the Korean Intellectual Property Office, the disclosure of which is incorporated by reference herein in its entirety.

BACKGROUND

The present disclosure relates generally to an automated driving system, and more particularly, to a data storage system for automated driving, an operation method of the data storage system for automated driving, and an operation method of a system.

An automated driving system may provide a solution in which vehicle control and turn may be performed automatically without intervention of a driver and/or with minimum intervention of the driver. Recently, research and development has been conducted in relation to the automated driving system, and/or various laws and/or regulations related thereto have been enacted. For example, in the automated driving system, when a vehicle accident occurs, data (e.g., event data recorder (EDR) data and/or image data) for a period of time (e.g., 30 seconds) before the accident should be provided to a designated government agency. In order to secure the reliability of various sensor data, a related automated driving system may store and/or manage the sensor data in a non-volatile memory. However, the process of storing sensor data generated in real time in the non-volatile memory may cause unnecessary performance degradation and/or loss of data of a specific point in time.

SUMMARY

Embodiments of the present disclosure provide a data storage system for automated driving with improved reliability and improved performance when compared to related automated driving systems, an operation method of the data storage system for automated driving, and an operation method of a system.

According to an aspect of an embodiment, a data storage system for automated driving, includes: a non-volatile memory device; a dedicated memory configured to be managed by an external host as a system memory; an auxiliary power supply configured to provide an auxiliary power; and a storage controller configured to, under control of the external host, store user data in the nonvolatile memory device and store sensor data in the dedicated memory in a ring buffer manner, wherein the storage controller is further configured to, based on a trigger condition being satisfied, flush at least a portion of the sensor data stored in the dedicated memory to the non-volatile memory device by using the auxiliary power.

According to an aspect of an embodiment, an operation method of a data storage system for automated driving, includes: storing, in a dedicated memory of the data storage system, sensor data in a ring buffer manner under control of an external host, the sensor data having been collected from at least one sensor device of the external host; storing, in a non-volatile memory device of the data storage system, user data under control of the external host; and based on a trigger condition being satisfied, flushing, to the non-volatile memory device, at least a portion of the sensor data stored in the dedicated memory.

According to an aspect of an embodiment, an operation method of a system, includes: sending, by a host of the system to a storage device of the system, a write request including first data; storing, by the storage device in response to the write request, the first data in a dedicated memory of the storage device; sending, by the storage device to the host, a first completion response; writing, by the host, an operation command in a submission queue of the storage device; providing, by the host, a doorbell signal to the storage device; fetching, by the storage device in response to the doorbell signal, the operation command from the submission queue; performing, by the storage device, an operation corresponding to the operation command; writing, by the storage device in a completion queue of the host, a second completion response indicating completion of the performing the operation; sending, by the storage device to the host, an interrupt; processing, by the host in response to the interrupt, the second completion response; based on a trigger condition being satisfied, sending, by the host to the storage device, a flush request; and storing, by the storage device in response to the flush request, the first data stored in the dedicated memory in a non-volatile memory device of the storage device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a block diagram illustrating a storage controller of FIG. 1, according to an embodiment;

FIG. 4 is a diagram for describing a memory area managed or identified by a host of FIG. 1, according to an embodiment;

FIG. 5 is a block diagram illustrating a storage controller of FIG. 1, according to an embodiment;

FIG. 6 is a flowchart illustrating an operation of a system of FIG. 1, according to an embodiment;

FIG. 9 is a block diagram illustrating an automated driving system, according to an embodiment.

DETAILED DESCRIPTION

Figure 1:
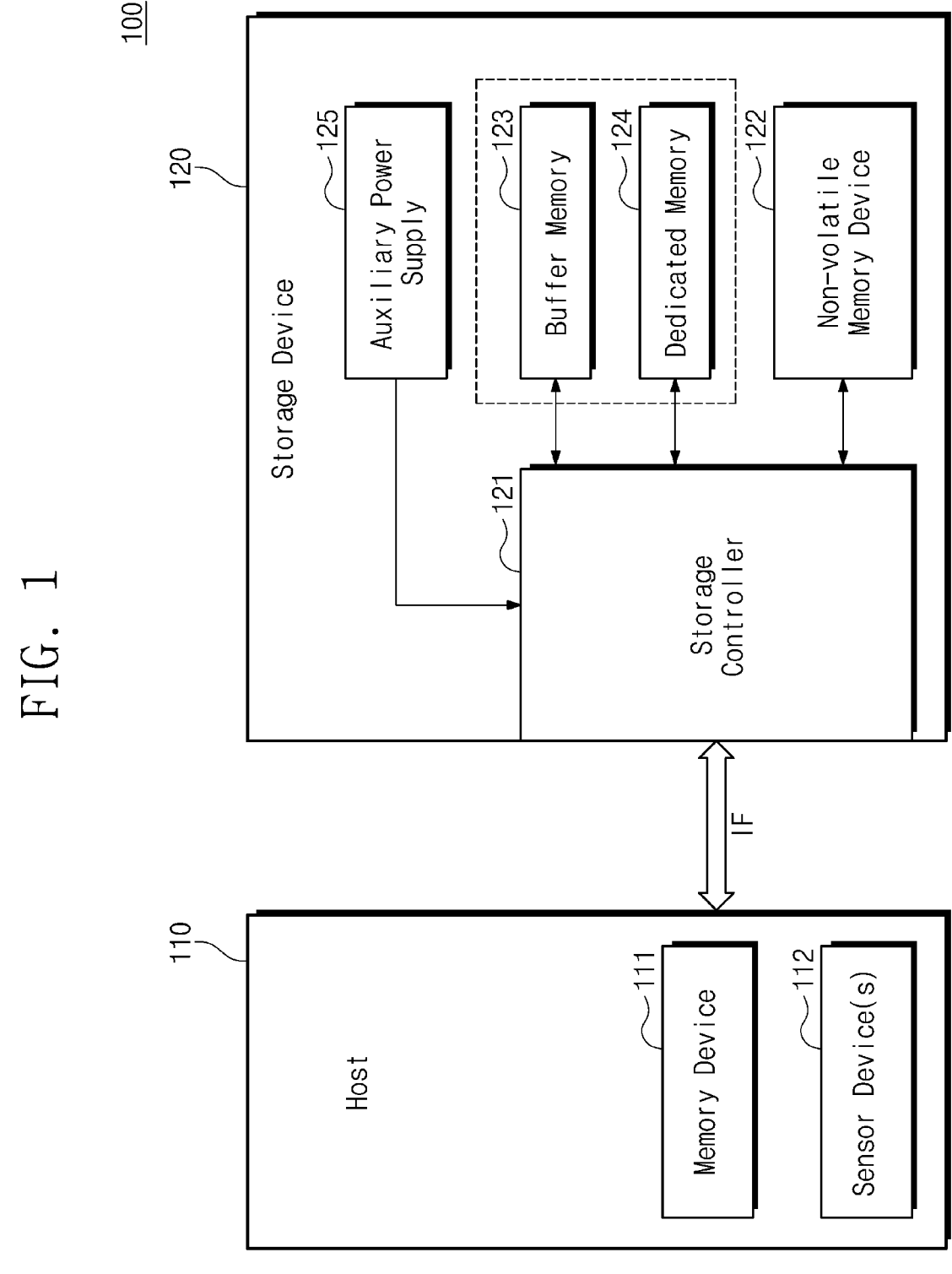
FIG. 1 is a block diagram illustrating a system, according to an embodiment.

The following description with reference to the accompanying drawings is provided to assist in a comprehensive understanding of embodiments of the present disclosure defined by the claims and their equivalents. Various specific details may be included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures may be omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Components described in the present disclosure by using the terms such as "part", "unit", "module", "engine", and the like, and function blocks illustrated in drawings, may be implemented with software, hardware, and/or a combination thereof. For example, the software may include, but not be limited to, a machine code, firmware, an embedded code, and application software. For another example, the hardware may include, but not be limited to, an electrical circuit, an electronic circuit, a processor, a computer, an integrated circuit, integrated circuit cores, a pressure sensor, an inertial sensor, a microelectromechanical system (MEMS), a passive element, and/or a combination thereof.

It is to be understood that terms used herein, which may include technical terminologies or scientific terminologies, may have the same meaning as that understood by those of ordinary skill in the art. Terms defined in a generally used dictionary are to be interpreted to have meanings equal to the contextual meanings in a relevant technical field, and are not interpreted to have ideal or excessively formal meanings unless clearly defined in the present disclosure.

Hereinafter, various embodiments of the present disclosure are described with reference to the accompanying drawings.

FIG. 1 is a block diagram illustrating a system according to an embodiment of the present disclosure. Referring to FIG. 1, a system 100 may include a host 110 and a storage device 120. In an embodiment, the system 100 may be included in an automated driving system and/or an automotive electronic system such as, but not limited to, an advanced driver assistance system (ADAS). Alternatively or additionally, the system 100 may include a data storage system for automated driving (DSSAD) configured to store and/or manage various information and/or various data in the automated driving system. However, the present disclosure is not limited thereto. For example, the system 100 may be included in user devices, such as, but not limited to, a personal computer (PC), a laptop computer, a server, a media player, a digital camera, and/or automotive devices such as, but not limited to, a navigation system, a black box, and/or an automotive electronic device/part. Alternatively or additionally, the system 100 may be included in a mobile system such as a mobile phone, a smartphone, a tablet, a PC, a wearable device, a health care device, an internet of things (IoT) device, or the like.

The host 110 may control an overall operation of the system 100. For example, when the system 100 includes an automated driving system, the host 110 may be configured to control various devices (e.g., a power device, a braking device, a steering device, and/or a lighting device) included in the automated driving system and/or a vehicle, based on information collected from sensor devices 112.

The host 110 may include a memory device 111 and the sensor devices 112. The memory device 111 may be configured to store various information by the operation of the host 110. The information stored in the memory device 111 may include a program code that is driven by the host 110 and/or data that is managed by an operation of the host 110. The memory device 111 may operate as a system memory and/or a working memory by the host 110. In an embodiment, the memory device 111 may be a dynamic random access memory (DRAM) device, but the present disclosure is not limited thereto.

The sensor devices 112 may be configured to collect various information from the inside and/or the outside of the system 100. For example, the sensor devices 112 may include a camera and/or an image sensor configured to collect image information about a field of view. Alternatively or additionally, the sensor devices 112 may include a speed sensor and/or a global positioning system (GPS) sensor configured to sense a speed and/or a location of a vehicle that includes the system 100. Alternatively or additionally, the sensor devices 112 may include various sensors configured to collect information about operations of various devices included in the system 100.

The storage device 120 may operate under control of the host 110. For example, under control of the host 110, the storage device 120 may store data and/or may output the stored data.

The storage device 120 may include a storage controller 121, a non-volatile memory device 122, a buffer memory 123, a dedicated memory 124, and an auxiliary power supply 125. The storage controller 121 may perform various operations under control of the host 110. For example, under control of the host 110, the storage controller 121 may store data in the non-volatile memory device 122 and/or may send data stored in the non-volatile memory device 122 to the host 110. Alternatively or additionally, under control of the host 110, the storage controller 121 may store data in the dedicated memory 124 and/or may flush the data stored in the dedicated memory 124 to the non-volatile memory device 122.

The non-volatile memory device 122 may operate under control of the storage controller 121. In an embodiment, the non-volatile memory device 122 may be a NAND flash memory device. However, the present disclosure is not limited thereto. For example, the non-volatile memory device 122 may include various types of non-volatile memories such as, but not limited to, a phase change RAM (PRAM), a magnetic RAM (MRAM), a resistive RAM (ReRAM), and the like.

The buffer memory 123 may be used as a buffer memory and/or a working memory of the storage controller 121. For example, the buffer memory 123 may be configured to store meta data, which may be used by the storage controller 121, such as, but not limited to, a map table. Alternatively or additionally, the buffer memory 123 may be configured to temporarily store the write data received from the host 110 and/or the read data received from the non-volatile memory device 122.

The dedicated memory 124 may be used as a buffer memory, a working memory, and/or a system memory of the host 110. In an embodiment, the dedicated memory 124 may be allocated to the host 110 during an initialization operation of the storage device 120. For example, during the initialization operation of the storage device 120, the storage device 120 may notify the host 110 of a buffer area capable of being allocated to the dedicated memory 124. The host 110 may allocate an additional system memory address to the buffer area capable of being allocated as the dedicated memory 124. The host 110 may be configured to directly access the dedicated memory 124, based on the system memory address.

In an embodiment, the host 110 and the storage device 120 may communicate with each other through an interface IF. In an embodiment, the interface IF may comply with one or more standards. For example, the interface IF may be configured to support a Non-Volatile Memory Express (NVMe) interface that is based on a Peripheral Component Interconnect express (PCIe) physical layer. For another example, the interface IF may be configured to support a Compute eXpress Link (CXL) interface that is based on the PCIe physical layer.

In an embodiment, the host 110 may be configured to directly access the dedicated memory 124 based on the CXL interface supported by the interface IF. That is, the dedicated memory 124 may be recognized as a buffer memory and/or a system memory of the host 110. The host 110 may be configured to store various data (e.g., data collected from the sensor devices 112) in the dedicated memory 124.

In an embodiment, each of the buffer memory 123 and the dedicated memory 124 may include a DRAM device, but the present disclosure is not limited thereto. In an embodiment, the buffer memory 123 and the dedicated memory 124 may be logically distinguished from each other in the same DRAM device. Alternatively or additionally, the buffer memory 123 and the dedicated memory 124 may be physically separated from each other in a same DRAM device. In an embodiment, the buffer memory 123 and the dedicated memory 124 may be included in different DRAM devices. That is, the present disclosure is not limited in this regard.

The auxiliary power supply 125 may be configured to supply an auxiliary power to the storage device 120. For example, when a power supplied to the storage device 120 is suddenly turned off (e.g., in a sudden power-off (SPO) event), the storage device 120 may perform an SPO operation by using the auxiliary power from the auxiliary power supply 125. In an embodiment, the SPO operation may include an operation of flushing data present in the buffer memory 123 and the dedicated memory 124 to the non-volatile memory device 122.

In an embodiment, the dedicated memory 124 included in the storage device 120 may be used as a buffer memory and/or a system memory by the host 110. For example, the host 110 may be configured to directly store and/or record specific data (e.g., sensor data collected from the sensor devices 112) in the dedicated memory 124 in a ring buffer manner. In this case, the dedicated memory 124 may store the sensor data (e.g., sensor data collected from the sensor devices 112 of the host 110) during a predetermined time period immediately prior to a current time point.

In an embodiment, when the system 100 includes an automated driving system and/or an ADAS system, data (hereinafter referred to as "event data") collected from the sensor devices 112 during a specific time period (e.g., 30 seconds) from a point in time when a specific event (e.g., a vehicle accident event) occurs may be considered to be important. For example, the event data may need to be preserved when an accident occurs and may need to be provided to a specific agency (e.g., National Highway Traffic Safety Administration (NHTSA)). In an embodiment, regulations related to the accident data of the automated driving system may be specified in regulations and/or standards for a data storage system of an automated driving system, such as, but not limited to, United Nations Economic Commission for Europe (UNECE) R157—Automated Lane Keeping Systems (ALKS).

A host of a related automated driving system may record and/or manage sensor data collected from sensor devices in a memory device and/or a separate external memory, as such, when a specific event (e.g., an SPO event) occurs in the related system, the sensor data recorded on the memory device may not be preserved.

In contrast, the host 110 according to an embodiment may use the dedicated memory 124 of the storage device 120 including the auxiliary power supply 125 as a system memory. That is, the host 110 may directly record and/or manage the sensor data on the dedicated memory 124 of the storage device 120 such that, when the SPO event or any other event occurs, the host 110 may flush the sensor data from the dedicated memory 124 to the non-volatile memory device 122 by using the auxiliary power supply 125 of the storage device 120. Accordingly, it may be possible to preserve accident data (e.g., sensor data of 30 seconds before an accident time point) stored in the dedicated memory 124.

Figure 2:
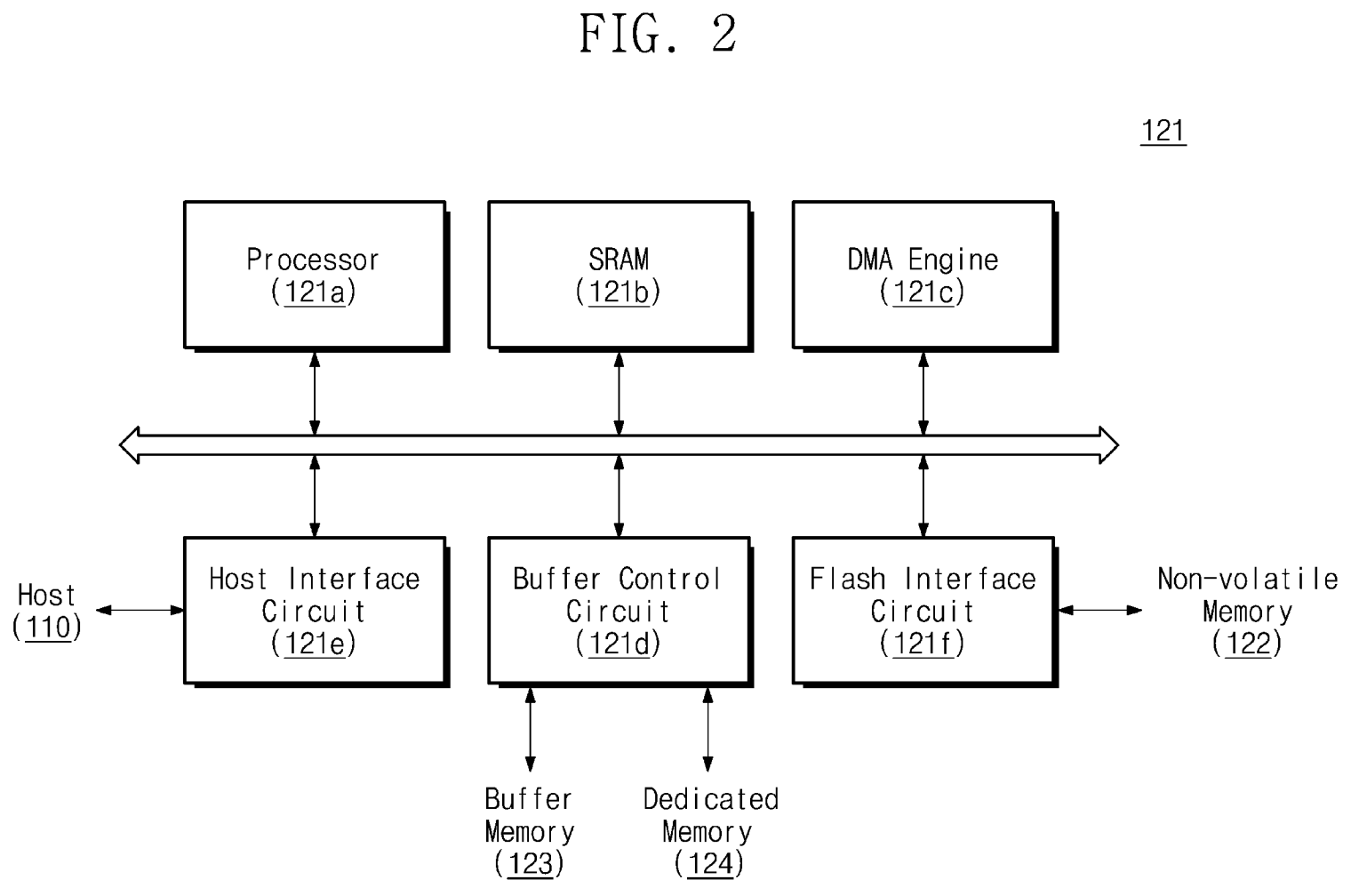

FIG. 2 is a block diagram illustrating a storage controller 121 of FIG. 1. Referring to FIGS. 1 and 2, the storage controller 121 may include a processor 121a, a static random access memory (SRAM) 121b, a direct memory access (DMA) engine 121c, a buffer control circuit 121d, a host interface circuit 121e, and a flash interface circuit 121f.

The processor 121a may be configured to control an overall operation of the storage controller 121. The SRAM 121b may be configured to store various information necessary for the storage controller 121 to operate. In an embodiment, information and/or data stored in the SRAM 121b may be used, executed, managed, and/or controlled by the processor 121a.

The DMA engine 121c may be configured to control a data flow and/or a DMA operation between various components included in the storage controller 121, the storage device 120, and/or the host 110. In an embodiment, the DMA engine 121c may be configured to control the data flow and/or the DMA operation between the host 110 and the dedicated memory 124. For example, the host 110 may be configured to use the dedicated memory 124 as a system memory and to directly access the dedicated memory 124. In such an example, the DMA engine 121c may be configured to control a sensor data flow from the host 110 to the dedicated memory 124 and/or the DMA operation, in response to a request received from the host 110.

The buffer control circuit 121d may be configured to control the buffer memory 123 and the dedicated memory 124. In an embodiment, the buffer control circuit 121d may include a first sub-control circuit configured to control the buffer memory 123 and a second sub-control circuit configured to control the dedicated memory 124.

The host interface circuit 121e may be configured to support communication with the host 110. In an embodiment, the host interface circuit 121e may be configured to support the PCIe physical layer. That is, the host interface circuit 121e may be configured to support the interface IF (e.g., an NVMe interface, a CXL interface, or the like). In an embodiment, the host interface circuit 121e may include a switch (not shown) configured to support the NVMe interface based on the PCIe physical layer and the CXL interface based on the PCIe physical layer.

The flash interface circuit 121f may be configured to support communication with the non-volatile memory device 122. In an embodiment, the flash interface circuit 121f may be configured to support a toggle NAND interface, an Open NAND Flash Interface (ONFI), or the like.

The number and arrangement of components of the storage controller 121 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be integrated with the storage controller 121 and implemented as an integrated circuit, as software, and/or a combination of circuits and software.

Figure 3:
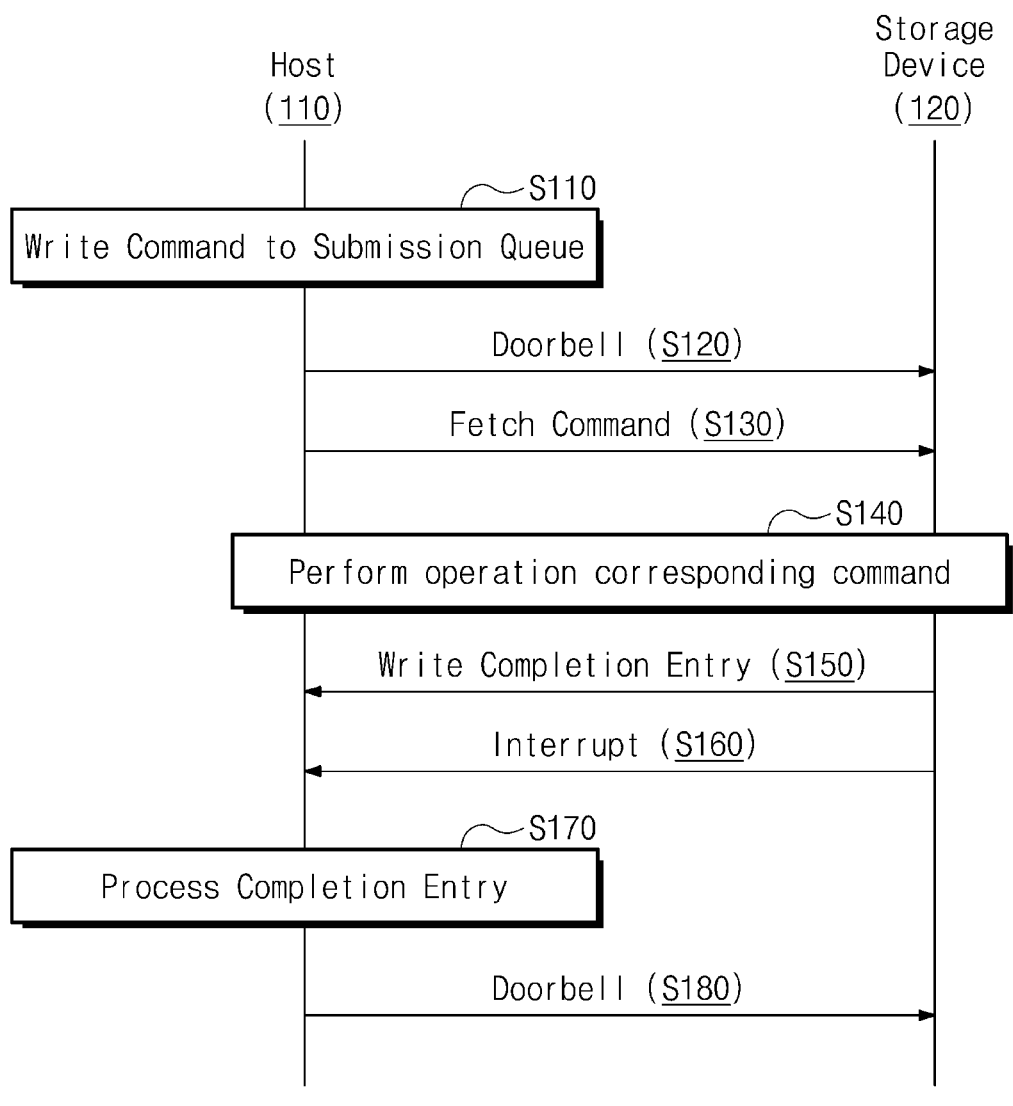
FIG. 3 is a flowchart for describing an operation of a system of FIG. 1, according to an embodiment.

FIG. 3 is a flowchart for describing an operation of a system of FIG. 1. In an embodiment, through an operation according to the flowchart of FIG. 3, the host 110 may store data in the storage device 120 and/or may read data from the storage device 120, based on the NVMe interface, for example. That is, the host 110 may use the storage device 120 as a high-capacity storage medium.

Referring to FIGS. 1 and 3, in operation S110, the host 110 may write an operation command in a submission queue. For example, the host 110 may write the operation command in an entry of the submission queue created in the memory device 111. In an embodiment, the operation command may include a command corresponding to a read operation, a write operation, and/or any other operation for the storage device 120.

In operation S120, the host 110 may send a doorbell (e.g., a signal) to the storage device 120. For example, the host 110 may write and/or set a corresponding submission queue doorbell register. In an embodiment, the doorbell in operation S120 may include information for notifying the storage device 120 that the host 110 has written the operation command in the submission queue.

In operation S130, the storage device 120 may fetch the operation command from the submission queue of the host 110 in response to the doorbell. For example, the storage device 120 may fetch the operation command written in the entry of the submission queue of the memory device 111 of the host 110.

In operation S140, the storage device 120 may perform an operation corresponding to the fetched operation command. For example, when the fetched operation command includes a read command, the storage controller 121 of the storage device 120 may read the read data stored in the non-volatile memory device 122. In an embodiment, the read data read from the non-volatile memory device 122 may be temporarily stored in the buffer memory 123.

Alternatively or additionally, when the fetched operation command includes a write command, the storage device 120 may program the write data received from the host 110 in the non-volatile memory device 122. For example, the storage device 120 may receive the write data by accessing the memory device 111 of the host 110. The storage device 120 may temporarily store the write data in the buffer memory 123 and/or may write and/or program the write data in the non-volatile memory device 122.

In operation S150, the storage device 120 may write a completion response entry in a completion queue of the host 110. For example, when the operation command fetched from the host 110 includes the write command, the storage device 120 may write completion information in an entry of the completion queue included in the memory device 111 of the host 110, which may provide a notification that the write data has been stored in the storage device 120. Alternatively or additionally, when the fetched operation command includes the read command, the storage device 120 may write completion information including the read data in the entry of the completion queue included in the memory device 111 of the host 110.

In operation S160, the storage device 120 may send an interrupt to the host 110. In an embodiment, in response to the interrupt from the storage device 120, the host 110 may determine that the completion information has been written in the completion queue.

In operation S170, the host 110 may process a completion entry of the completion queue. For example, the host 110 may access the completion information written in the completion entry of the completion queue, and may obtain the read data and/or may determine that the operation corresponding to the write command has been completed.

In operation S180, the host 110 may send the doorbell to the storage device 120. In an embodiment, the doorbell in operation S180 may include information notifying the storage device 120 that the host 110 has accessed and/or processed the completion queue.

As described above, the host 110 and the storage device 120 may perform operations based on the NVMe interface such as, but not limited to, the host 110 may store the user data in the storage device 120 and/or the host 110 may read the user data stored in the storage device 120. That is, the host 110 may use the storage device 120 as a high-capacity storage medium. However, the present disclosure is not limited thereto. For example, the host 110 and the storage device 120 may communicate and/or perform operations based on interfaces that comply with and/or support other memory storage standards.

Figure 4:
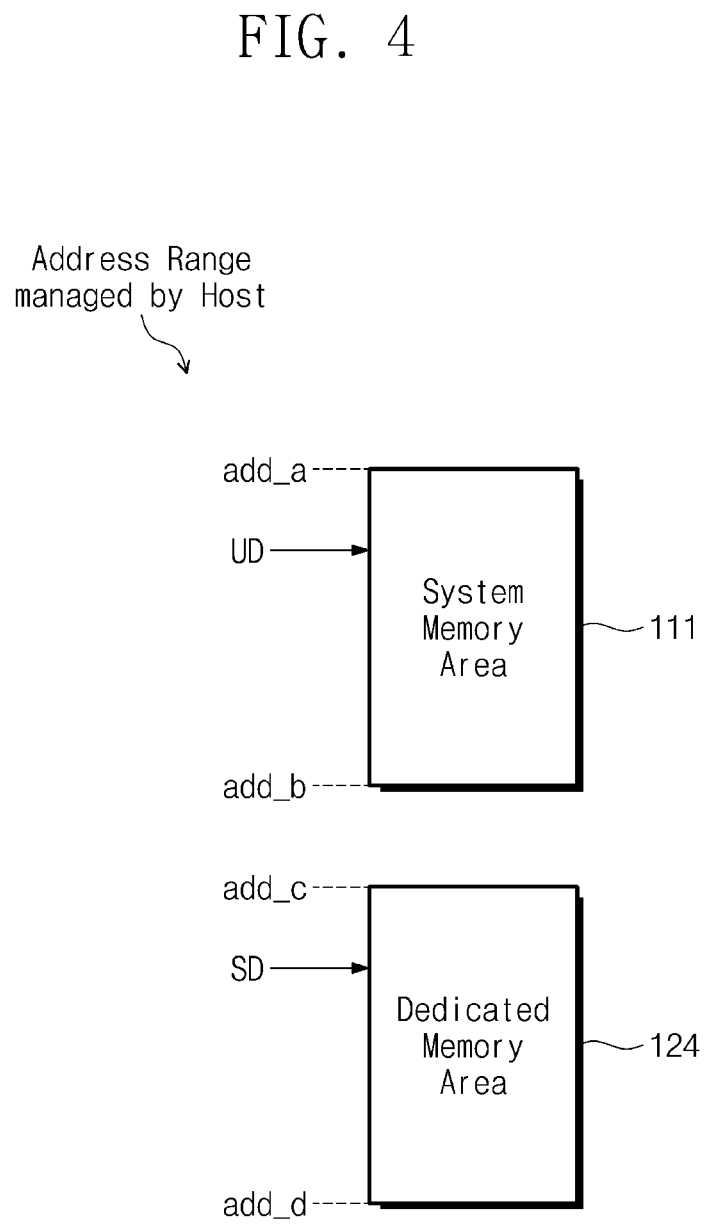

FIG. 4 is a diagram for describing a memory area managed and/or identified by a host 110 of FIG. 1. Referring to FIGS. 1 and 4, the host 110 may manage the memory device 111, based on an a-th address add_a to a b-th address add_b, where a is positive integer greater than or equal to zero (0) and b is a positive integer greater than zero (0). For example, the host 110 may be configured to store user data UD (and/or various different data used by the host 110) in an area of the memory device 111 by using the a-th address add_a to the b-th address add_b.

In an embodiment, the host 110 may manage an area of the dedicated memory 124 based on a c-th address add_c to a d-th address add_d, where c is positive integer greater than or equal to zero (0) and d is a positive integer greater than zero (0). For example, during the initialization operation of the storage device 120, the area of the dedicated memory 124 of the storage device 120 may be allocated for the host 110. That is, the host 110 may allocate the c-th address add_c to the d-th address add_d to the dedicated memory 124 of the storage device 120. In an embodiment, the host 110 may store sensor data SD (and/or various different data used by the host 110) in the dedicated memory 124 of the storage device 120 based on the c-th address add_c to the d-th address add_d. Alternatively or additionally, the host 110 may store the sensor data SD in the dedicated memory 124 in a ring buffer manner.

In an embodiment, addresses (e.g., add_a to add_b) corresponding to the memory device 111 may be logically distinguished from addresses (e.g., add_c to add_d) corresponding to the dedicated memory 124. That is, the host 110 may independently manage the memory device 111 and the dedicated memory 124 by logically distinguishing addresses for the respective memory areas.

FIG. 5 is a block diagram illustrating a storage controller. A storage controller 121-1 of FIG. 5 may include or may be similar in many respects to the storage controller 121 described above with reference to FIG. 2 and may include additional features not mentioned above. Overlapping descriptions associated with components described above may be omitted for the sake of brevity.

Referring to FIGS. 1 and 5, the storage controller 121-1 may include the processor 121a, the SRAM 121b, the DMA engine 121c, the buffer control circuit 121d, the host interface circuit 121e, the flash interface circuit 121f, and an input/output (I/O) memory management unit (IOMMU) 121g. The processor 121a, the SRAM 121b, the DMA engine 121c, the buffer control circuit 121d, the host interface circuit 121e, and the flash interface circuit 121f may include or may be similar in many respects to corresponding components described with reference to FIG. 2, and thus, overlapping descriptions may be omitted for the sake of redundancy.

The IOMMU 121g may be configured to control and/or manage access to the dedicated memory 124. For example, the host 110 may use the dedicated memory 124 as a system memory and/or allocate an address to the dedicated memory 124 that is recognized as the system memory. That is, when the storage controller 121 accesses the dedicated memory 124 based on the address managed by the host 110 (e.g., the address recognized as the system memory), the storage controller 121 may access the memory device 111 of the host 110 through the host interface circuit 121e. However, in some embodiments, access to the dedicated memory 124 may be performed in a different manner. For example, in such embodiments, when the storage controller 121-1 accesses the addresses corresponding to the dedicated memory 124, the IOMMU 121g may perform address mapping and/or translation such that access to the dedicated memory 124 of the storage device 120 is performed without communicating with the host 110.

That is, the storage controller 121-1 may access the dedicated memory 124 by using the address allocated by the host 110 (e.g., the address recognized as the system memory). As such, the storage controller 121-1 may perform a flush operation of the storage device 120 (e.g., the backup and/or movement of sensor data from the dedicated memory 124 to the non-volatile memory device 122).

FIG. 6 is a flowchart illustrating an operation of a system 100 of FIG. 1. In an embodiment, based on the operation of the flowchart of FIG. 6, the host 110 may access and/or manage the dedicated memory 124 included in the storage device 120 as a ring buffer. In an embodiment, based on the operation of the flowchart of FIG. 6, the host 110 may sequentially and/or time-serially record and/or store various sensor data in the dedicated memory 124 of the storage device 120.

Referring to FIGS. 1 and 6, in operation S210, the host 110 may send a write request for the sensor data SD to the storage controller 121 by using the interface IF. For example, the host 110 may obtain various sensor data SD (e.g., image data, driving data, power data, wheel speed data, steering data, and location data) through the sensor devices 112. The host 110 may store the obtained sensor data SD in the dedicated memory 124 included in the storage device 120, instead of the memory device 111, for example. The host 110 may send the write request for storing and/or writing the sensor data SD in the dedicated memory 124 of the storage device 120 to the storage controller 121.

In operation S220, the storage controller 121 may write the sensor data SD received from the host 110 in the dedicated memory 124. For example, the write request received in operation S210 may include the sensor data SD and address information. The storage controller 121 may be configured to store the sensor data SD included in the write request in the area of the dedicated memory 124, which corresponds to the address information. In an embodiment, the movement of the sensor data SD received from the host 110 may be performed by the DMA engine 121c described with reference to FIGS. 2 and 5.

In operation S230, the storage controller 121 may send the completion response to the host 110 by using the interface IF. In an embodiment, based on the completion response, the host 110 may recognize that the sensor data SD are stored in the dedicated memory 124.

In an embodiment, operations S210 to S230 may be performed based on the CXL interface that may be supported by the interface IF. For example, the host 110 may use the dedicated memory 124 of the storage device 120 as a system memory and/or a buffer memory. That is, the host 110 may directly access the dedicated memory 124 of the storage device 120 based on the CXL interface. For example, in operation S210, the host 110 may send a write request (e.g., master to slave request with data (M2S RwD)), which may be based on a CXL memory protocol (e.g., CXL.mem) of the CXL interface, to the storage controller 121 of the storage device 120. In operation S230, the storage controller 121 may send the completion response (e.g., slave to master no data response (S2M NDR)), which may be based on the CXL memory protocol (e.g., CXL.mem) of the CXL interface, to the host 110.

However, the present disclosure is not limited thereto. For example, the interface IF may include various interfaces with which the host 110 may directly access and/or manage the dedicated memory 124 of the storage device 120.

In operation S240, the host 110 may determine whether a trigger condition has been satisfied. For example, the trigger condition may include a SPO event of the system 100. Alternatively or additionally, when the system 100 includes an automated driving system, the trigger condition may include various events such as, but not limited to, a start of an emergency maneuver, involved in a detected collision, and abortion of lane change procedure, or an event data recorder (EDR) trigger input of the automated driving system. It is to be understood that the trigger conditions described above are only an example, and that the present disclosure is not limited thereto. That is, the trigger condition may include other events and/or conditions without departing from the scope of the present disclosure.

When the trigger condition is not satisfied (No in operation S240), the host 110 may repeatedly perform operation S210 to operation S230. That is, when there is no event that satisfies the trigger condition, the host 110 may record the sensor data SD in the dedicated memory 124 of the storage device 120 sequentially, time-serially, and/or in a ring buffer manner. Consequently, the sensor data SD from a current time point to a past specific time point (e.g., sensor data SD for the past 30 seconds from the current time point) may be maintained in the dedicated memory 124 of the storage device 120.

When the trigger condition is satisfied (Yes in operation S240), in operation S250, the host 110 may send a flush request to the storage device 120. For example, the trigger condition being satisfied may indicate an abnormal state and/or a danger state of the system 100. Consequently, in order to preserve the sensor data SD present in the dedicated memory 124 of the storage device 120, the host 110 may send the flush request for the dedicated memory 124 to the storage device 120.

In an embodiment, the flush request provided in operation S250 may be provided to the storage device 120 through the interface IF. For example, the flush request may be based on the NVMe interface that may be supported by the interface IF. Alternatively or additionally, the flush request may be provided to the storage device 120 from the host 110 through a separate signal line.

The storage device 120 may perform the flush operation on the dedicated memory 124 in response to the flush request from the host 110. For example, in operation S260, the storage device 120 may read the sensor data SD from the dedicated memory 124. In operation S270, the storage controller 121 may store the sensor data SD read from the dedicated memory 124 in the non-volatile memory device 122.

In an embodiment, the storage device 120 may repeatedly perform operation S260 and operation S270 until the sensor data SD present in the dedicated memory 124 is stored in the non-volatile memory device 122. Alternatively or additionally, the storage device 120 may perform operation S260 and operation S270 by using the auxiliary power supply 125. For example, the storage controller 121 may store the sensor data SD in a given area of the non-volatile memory device 122. In an embodiment, the storage controller 121 may store the sensor data SD in the non-volatile memory device 122 based on a high-speed program manner (e.g., a single level cell (SLC) program manner).

As described above, in some embodiments, the host 110 may be configured to record the sensor data SD at the dedicated memory 124 of the storage device 120. In such embodiments, when the trigger condition (e.g., an SPO event and/or various accident events of an automated driving system) is satisfied, the sensor data SD of the dedicated memory 124 may be flushed to the non-volatile memory device 122 by using the auxiliary power supply 125 present in the storage device 120. Accordingly, the integrity of data required in various systems may be guaranteed.

Figure 7:
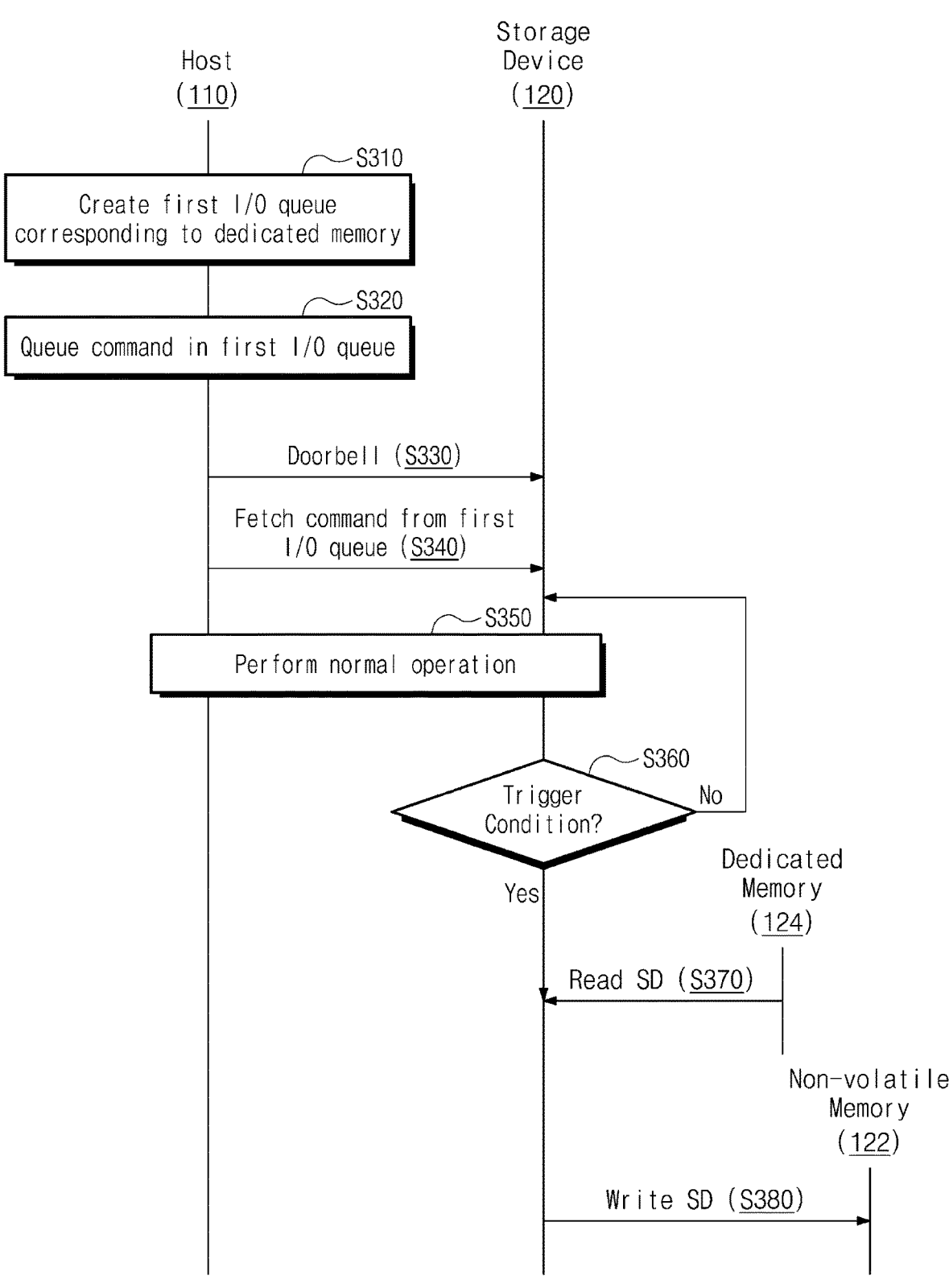
FIG. 7 is a flowchart illustrating an operation of a system of FIG. 1, according to an embodiment.

FIG. 7 is a flowchart illustrating a flush operation of a system 100 of FIG. 1. Referring to FIG. 7, an embodiment in which the storage device 120 performs the flush operation is described.

In operation S310, the host 110 may create a first I/O queue corresponding to the dedicated memory 124. For example, through the initialization operation of the storage device 120, the dedicated memory 124 of the storage device 120 may be allocated for the host 110. In an embodiment, the first I/O queue may include a first submission queue and/or a first completion queue. The first submission queue may be configured to store commands generated by the host 110, such as, but not limited to, a command for the storage device 120 to store data from the dedicated memory 124 to the non-volatile memory device 122. The first completion queue may be configured to store completion responses received from the storage device 120 such as, but not limited to, a completion response to the command for the storage device 120 to store data from the dedicated memory 124 to the non-volatile memory device 122.

In operation S320, the host 110 may add the command in the first I/O queue. For example, the host 110 may add the write command to the first I/O queue (e.g., the first submission queue) such that the storage device 120 stores the sensor data SD of the dedicated memory 124 in the non-volatile memory device 122.

In operation S330, the host 110 may send the doorbell to the storage controller 121. For example, the host 110 may write and/or set a submission queue doorbell register corresponding to the first submission queue. In an embodiment, the doorbell, in operation S330, may include information notifying the storage device 120 that the host 110 has written and/or added the command in the first submission queue.

In operation S340, the storage controller 121 may fetch the command from the first I/O queue (e.g., the first submission queue) in response to the doorbell. In an embodiment, the command fetched from the first I/O queue may include a command for flushing the sensor data SD present in the dedicated memory 124 to the non-volatile memory device 122. In an embodiment, the command fetched from the first I/O queue may not be processed until the trigger condition has been satisfied.

In operation S350, the host 110 and the storage controller 121 may perform a normal operation. For example, as described with reference to FIG. 3, the host 110 may perform a read operation and/or a write operation on the storage device 120. That is, the host 110 may control the storage device 120 as a high-capacity storage medium. Alternatively or additionally, by performing operations S210 to S230 of FIG. 6, the host 110 may store the sensor data SD in the dedicated memory 124 sequentially, time-serially, and/or in a ring buffer manner.

In operation S360, the storage controller 121 may determine whether the trigger condition has been satisfied. In an embodiment, the trigger condition may include an SPO event associated with the storage device 120. Alternatively or additionally, the trigger condition may include various situations such as, but not limited to, a start of an emergency maneuver, involved in a detected collision, and abortion of lane change procedure, or an event data recorder (EDR) trigger input of an automated driving system. In an embodiment, the trigger condition may be detected internally by the storage controller 121. Alternatively or additionally, the trigger condition may be detected by the host 110, and a signal indicating that the trigger condition has been satisfied may be provided by the host 110 to the storage controller 121.

When the trigger condition has not been satisfied (No in operation S360), the host 110 and the storage controller 121 (and/or the storage device 120) may continue to perform operation S350. That is, when the trigger condition has not been satisfied, the storage controller 121 may not process the command fetched from the first I/O queue.

When the trigger condition has been satisfied (Yes in operation S360), the storage controller 121 may store the sensor data SD of the dedicated memory 124 in the non-volatile memory device 122 by performing operations 370 to 380. For example, in operation S370, the storage controller 121 may read the sensor data SD from the dedicated memory 124. In operation S380, the storage controller 121 may store the sensor data SD in the non-volatile memory device 122.

In an embodiment, the operations performed through operations S370 and S380 may be operations corresponding to the command fetched in operation S340. For example, the command fetched in operation S340 may include the command fetched from the first I/O queue. The first I/O queue may include an address corresponding to the dedicated memory 124. That is, when the command added to the first I/O queue includes the write command, the write data corresponding to the write command may be stored in the dedicated memory 124. That is, the storage controller 121 may access the dedicated memory 124, may read the write data (e.g., the sensor data SD), and may store the write data in the non-volatile memory device 122.

As described above, when the trigger condition has been satisfied, the host 110 may create and/or manage a separate dedicated I/O queue for the purpose of managing a command for flushing the sensor data SD of the dedicated memory 124 to the non-volatile memory device 122.

Figure 8:
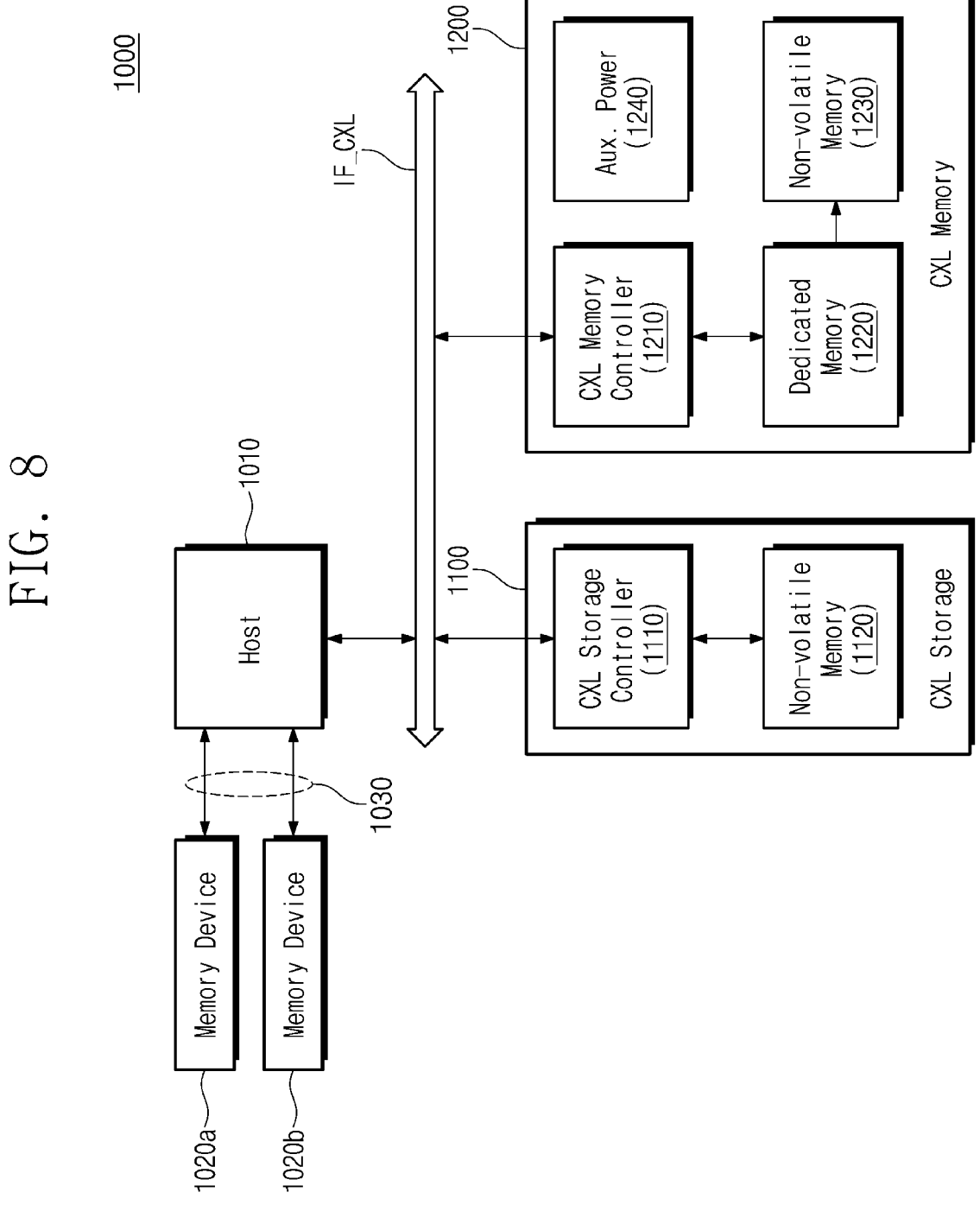
FIG. 8 is a block diagram illustrating a system, according to an embodiment.

FIG. 8 is a block diagram illustrating a system, according to an embodiment. Referring to FIG. 8, a system 1000 may include a host 1010, a plurality of memory devices (e.g., 1020a and 1020b, hereinafter "1020" generally), a CXL storage 1100, and a CXL memory 1200. In an embodiment, the system 1000 may be included in an automated driving system and/or an automotive electronic system such as, but not limited to, an ADAS. However, the present disclosure is not limited thereto. For example, the system 1000 may be included in user devices, such as a PC, a laptop computer, a server, a media player, a digital camera, and/or automotive devices such as, but not limited to, a navigation system, a black box, and an automotive electronic device/part. Alternatively or additionally, the system 1000 may include a mobile system such as, but not limited to, a mobile phone, a smartphone, a tablet, a PC, a wearable device, a health care device, or an IoT device.

The host 1010 may control an overall operation of the system 1000. In an embodiment, the host 1010 may include at least one of various processors such as a central processing unit (CPU), a graphics processing unit (GPU), a neural processing unit (NPU), and a data processing unit (DPU). In an embodiment, the host 1010 may include a single core processor and/or a multi-core processor.

The plurality of memory devices 1020 may be used as a main memory and/or a system memory of the system 1000 and/or the host 1010. In an embodiment, each of the plurality of memory devices 1020 may include a DRAM device and/or may have a form factor of a dual in-line memory module (DIMM). However, the present disclosure is not limited thereto. For example, the plurality of memory devices 1020 may include a non-volatile memory such as, but not limited to, a flash memory, a PRAM, a ReRAM, a MRAM, or the like.

The plurality of memory devices 1020 may directly communicate with the host 1010 through a double data rate (DDR) interface 1030. In an embodiment, the host 1010 may include a memory controller (not shown) configured to control the plurality of memory devices 1020. However, the present disclosure is not limited thereto. For example, the plurality of memory devices 1020 may communicate with the host 1010 through various interfaces.

The CXL storage 1100 may include a CXL storage controller 1110 and a non-volatile memory 1120. Under control of the host 1010, the CXL storage controller 1110 may store data in the non-volatile memory 1120 and/or may send data stored in the non-volatile memory 1120 to the host 1010. In an embodiment, the non-volatile memory 1120 may include a NAND flash memory, but the present disclosure is not limited thereto.

The CXL memory 1200 may include a CXL memory controller 1210, a dedicated memory 1220, a non-volatile memory 1230, and an auxiliary power supply 1240. Under control of the host 1010, the CXL memory controller 1210 may store data in the dedicated memory 1220 and/or may send data stored in the dedicated memory 1220 to the host 1010. In an embodiment, the dedicated memory 1220 may include a DRAM, but the present disclosure is not limited thereto.

In an embodiment, the host 1010, the CXL storage 1100, and the CXL memory 1200 may be configured to share a same interface. For example, the host 1010, the CXL storage 1100, and the CXL memory 1200 may communicate with each other through a CXL interface IF CXL. In an embodiment, the CXL interface IF CXL may include a low-latency and high-bandwidth link that may support coherency, memory access, and dynamic protocol muxing of I/O protocols such that various connections between accelerators, memory devices, or various electronic devices may be possible.

In an embodiment, the host 1010 may access the CXL memory 1200 through the CXL interface IF CXL. That is, the host 1010 may use the dedicated memory 1220 of the CXL memory 1200 as a system memory. For example, as described with reference to FIGS. 1 to 7, the host 1010 may store the sensor data SD in the dedicated memory 1220 of the CXL memory 1200. In an embodiment, when a trigger condition has been satisfied, the host 1010 may control the CXL memory 1200 to flush the sensor data SD present in the dedicated memory 1220 to the non-volatile memory 1230. For example, the CXL memory 1200 may perform the above flush operation by using the auxiliary power supply 1240.

It is to be understood that the above configuration of the system 1000 is only an example, and that the present disclosure is not limited thereto. That is, the number and arrangement of components of the system 1000 may differ from the above-described embodiments without affecting the functionality described therein. For example, in an embodiment, the host 1010 of the system 1000 may be configured to store sensor data SD in a separate external memory (not shown). In such an embodiment, when an SPO event is detected, the host 1010 may be configured to store and/or flush the sensor data SD of the external memory to a storage device and/or a separate non-volatile memory device (not shown). Alternatively or additionally, while the flush operation is performed, an auxiliary power supply (not shown) may provide an auxiliary power such that the communication and/or link between the external memory and the storage device (or non-volatile memory device) continues to operate at least until the flush operation has been completed.

Figure 9:
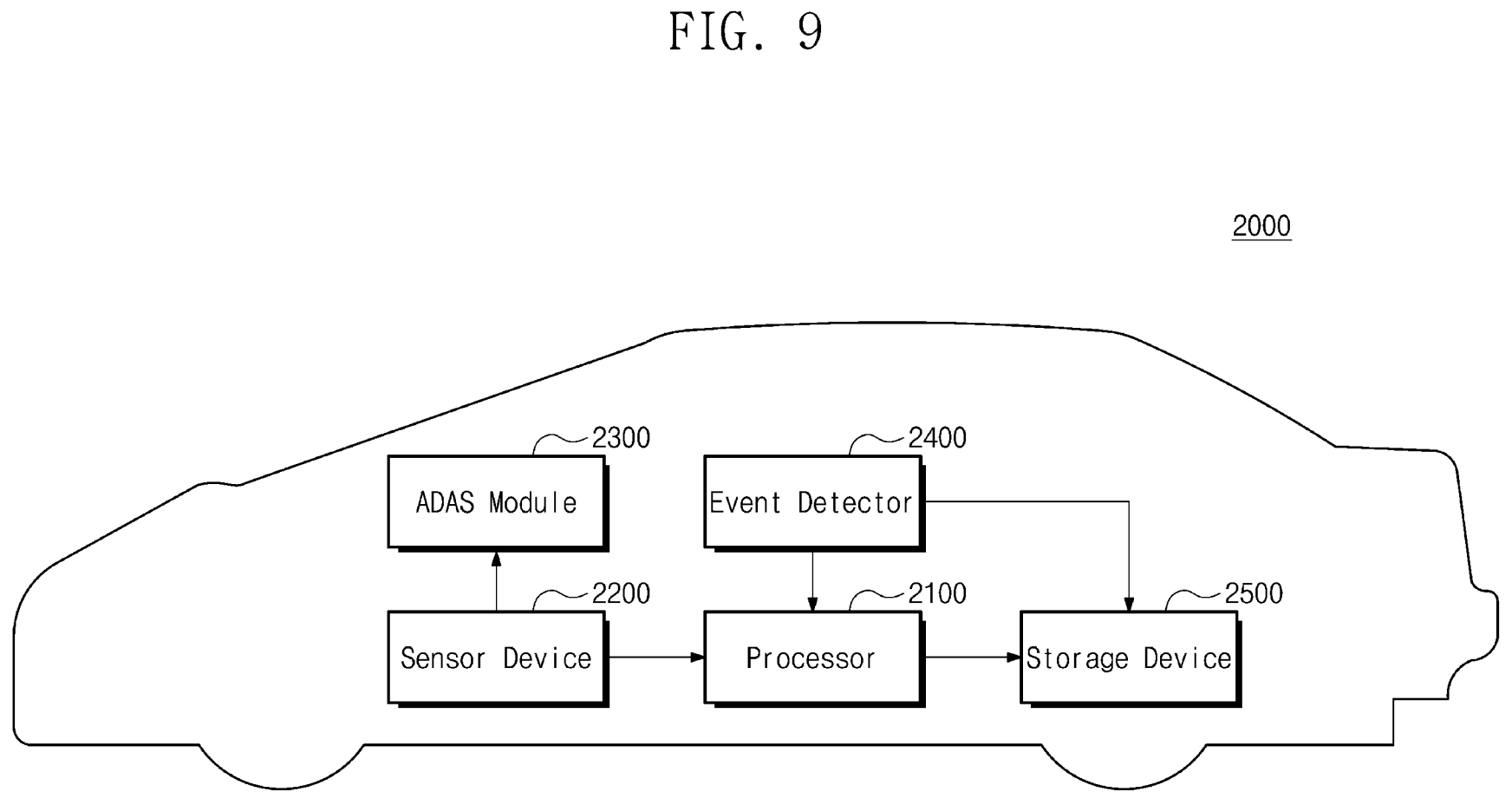

FIG. 9 is a block diagram illustrating an automated driving system, according to an embodiment. Referring to FIG. 9, an automated driving system 2000 may include a processor 2100, a sensor device 2200, an ADAS module 2300, an event detector 2400, and a storage device 2500.

The processor 2100 may control an overall operation of the automated driving system 2000. The sensor device 2200 may be configured to sense various operation information and/or sensing information of the automated driving system 2000. The ADAS module 2300 may control operations (e.g., a steering operation, a braking operation, and an acceleration operation) of the automated driving system 2000 based on the sensing information from the sensor device 2200 and/or commands from the processor 2100.

The event detector 2400 may be configured to detect various events that may occur during operation of the automated driving system 2000. For example, the event detector 2400 may be configured to detect one or more trigger conditions (e.g., SPO event, a start of an emergency maneuver, involved in a detected collision, and abortion of lane change procedure, an event data recorder (EDR) trigger input, or the like).

The storage device 2500 may be configured to store data and/or to output the stored data under control of the processor 2100. In an embodiment, the storage device 2500 may include a DSSAD. The storage device 2500 may include or be similar in many respects to the storage devices described with reference to FIGS. 1 to 8 (e.g., storage controller 121, storage controller 121-1) and may include additional features not mentioned above. For example, the storage device 2500 may be configured to store user data and/or sensor data under control of the processor 2100. That is, the sensor data may be stored in a dedicated memory included in the storage device 2500. In an embodiment, when an event (e.g., the trigger condition) has been detected by the event detector 2400, the storage device 2500 may flush the sensor data present in the dedicated memory to a non-volatile memory. The operation of the storage device 2500 may similar to operations described with reference to FIGS. 1 to 8 and, thus, overlapping descriptions may be omitted for the sake of brevity.

In an embodiment, the storage device 2500 may include a communication module (not shown) configured to provide the sensor data stored in the non-volatile memory to an external device and/or an external agency. For example, the storage device 2500 may include a wireless communication module and/or an on-board diagnostics (ODB) module (not shown) configured to send sensor data (e.g., accident data) to the external device and/or external agency. However, the present disclosure is not limited thereto. For example, the wireless communication module and/or the ODB module may be provided outside of the storage device 2500 (e.g., may be included in the automated driving system 2000).

Figure 10:
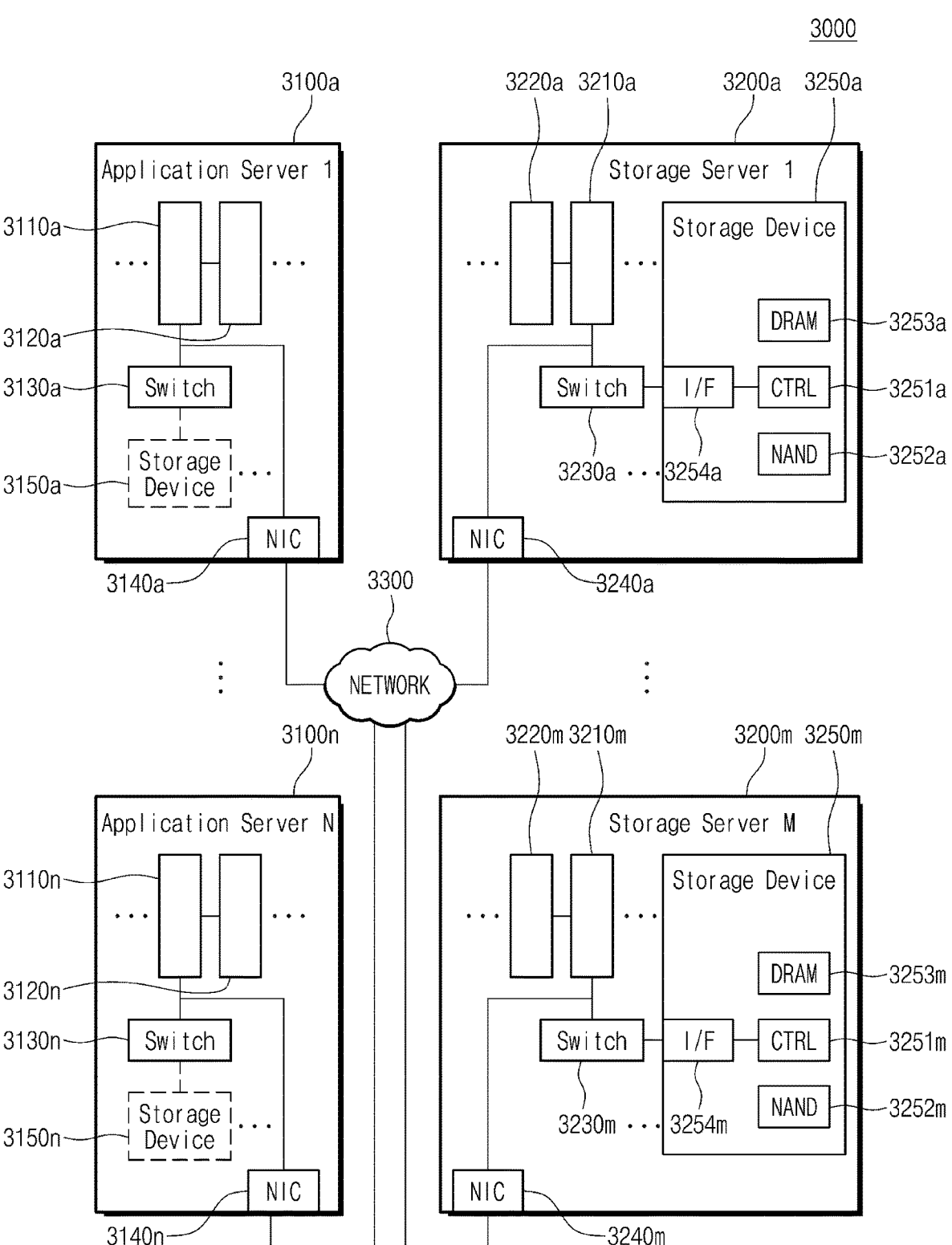
FIG. 10 is a block diagram illustrating a data center, according to an embodiment.

FIG. 10 is a diagram of a data center 3000 to which a memory device is applied, according to an embodiment. Referring to FIG. 10, the data center 3000 may include a facility that collects various types of pieces of data and provides services and may be referred to as a data storage center. The data center 3000 may include a system for operating a search engine and a database, and may include a computing system used by companies, such as, but not limited to, private enterprises, banks, or government agencies. The data center 3000 may include application servers (e.g., 3100a to 3100n, hereinafter "3100" generally, where n represents a positive integer greater than one (1)) and storage servers (e.g., 3200a to 3200m, hereinafter "3100" generally, where m represents a positive integer greater than one (1)). The number of application servers 3100 (e.g., n) and the number of storage servers 3200 (e.g., m) may be selected according to various embodiments. For example, in some embodiments, the number of application servers 3100 (e.g., n) may be different from the number of storage servers 3200 (e.g., m).

The application server 3100 and/or the storage server 3200 may include at least one of processor (e.g., 3110 and 3210) and at least one memory (e.g., 3120 and 3220). The storage server 3200 is described as an example. The processor 3210 may control operations of the storage server 3200 such as, but not limited to, accessing the memory 3220 and/or executing instructions and/or data loaded in the memory 3220. The memory 3220 may include a DDR synchronous DRAM (DDR SDRAM), a high-bandwidth memory (HBM), a hybrid memory cube (HMC), a DIMM, Optane DIMM, and/or a non-volatile DIMM (NVMDIMM). The numbers of processors 3210 and/or memories 3220 included in the storage server 3200 may be selected according to various embodiments. For example, in an embodiment, the processor 3210 and the memory 3220 may provide a processor-memory pair. In an embodiment, the number of processors 3210 may be different from the number of memories 3220. The processor 3210 may include a single-core processor and/or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be selected according to various embodiments.

The application servers 3100 may communicate with the storage servers 3200 through a network 3300. The network 3300 may be implemented by using a fiber channel (FC) and/or Ethernet, for example. In an embodiment, the FC may refer to a medium used for relatively high-speed data transmission and may use an optical switch with high performance and high availability. The storage servers 3200 may be provided as file storages, block storages, and/or object storages according to an access method of the network 3300.

In an embodiment, the network 3300 may include a storage-dedicated network, such as a storage area network (SAN). For example, the SAN may include an FC-SAN, which may use an FC network and may be implemented according to an FC protocol (FCP). As another example, the SAN may include an internet protocol (IP)-SAN, which may use a transmission control protocol (TCP)/IP network and may be implemented according to a small computer system interface (SCSI) over TCP/IP or Internet SCSI (iSCSI) protocol. In an embodiment, the network 3300 may include a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 are described. A description of the application server 3100 may be applied to another of the application servers 3100. A description of the storage server 3200 may be applied to another of the storage servers 3200.

The application server 3100 may store data, which may be requested by a user and/or a client to be stored, in one of the storage servers 3200 through the network 3300. Alternatively or additionally, the application server 3100 may obtain data, which may be requested by the user and/or the client to be read, from one of the storage servers 3200 through the network 3300. For example, the application server 3100 may be implemented as a web server and/or a database management system (DBMS).

The application server 3100 may access a memory 3120 and/or a storage device 3150, which may be included in another application server 3100, through the network 3300. Alternatively or additionally, the application server 3100 may access, through the network 3300, memories 3220 and/or storage devices 3250, which may be included in the storage servers 3200. Thus, the application server 3100 may perform various operations on data stored in application servers 3100 and/or the storage servers 3200. For example, the application server 3100 may execute an instruction for moving and/or copying data between the application servers 3100 and/or the storage servers 3200. That is, the data may be moved from the storage devices 3250 of the storage servers 3200 to the memories 3120 of the application servers 3100 directly or through the memories 3220 of the storage servers 3200. In some embodiments the data moved through the network 3300 may be encrypted for security and/or privacy.

The storage server 3200 is described as an example. An interface 3254 may provide a physical connection between a processor 3210 and a controller 3251 and a physical connection between a network interface card (NIC) 3240 and the controller 3251. In an embodiment, the interface 3254 may be implemented using a direct attached storage (DAS) scheme in which the storage device 3250 is directly connected with a dedicated cable. For example, the interface 3254 may be implemented by using various interface schemes, such as, but not limited to, advanced technology attachment (ATA), serial SATA (SATA), external SATA (e-SATA), an SCSI, serial attached SCSI (SAS), Peripheral Component Interconnect (PCI), PCIe, NVMe, Institute of Electrical and Electronics Engineers (IEEE) 1394 (FireWire), an universal serial bus (USB) interface, a secure digital (SD) card interface, a multi-media card (MMC) interface, an embedded MMC (eMMC) interface, and universal flash storage (UFS) interface, an embedded UFS (eUFS) interface, a compact flash (CF) card interface, and the like.

In an embodiment, the storage server 3200 may include a switch 3230 and the NIC 3240. The switch 3230 may selectively connect the processor 3210 to the storage device 3250 and/or may selectively connect the NIC 3240 to the storage device 3250 via the control of the processor 3210.

In an embodiment, the NIC 3240 may include a network interface card and/or a network adaptor. The NIC 3240 may be connected to the network 3300 by a wired interface, a wireless interface, a Bluetooth interface, an optical interface, and/or a combination thereof. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 or the application servers 3100, a processor may transmit a command to storage devices 3150 and 3250 and/or the memories 3120 and 3220, and program and/or read data. In an embodiment, the data may include data in which at least one error may have been corrected by an ECC engine (not shown). Alternatively or additionally, the data may include data on which a data bus inversion (DBI) operation and/or a data masking (DM) operation may have been performed, and/or may include cyclic redundancy code (CRC) information. In an embodiment, the data may include data encrypted for security and/or privacy.

In an embodiment, storage devices 3150 and 3250 may transmit a control signal and a command/address signal to NAND flash memory devices 3252 in response to a read command received from the processor. For example, when data is read from the NAND flash memory devices 3252, a read enable (RE) signal may be input as a data output control signal, and thus, the data may be output to a DQ bus. A data strobe signal DQS may be generated using the RE signal. In some embodiments, the command and/or the address signal may be latched in a page buffer depending on a rising edge and/or a falling edge of a write enable (WE) signal.

The controller 3251 may control operations of the storage device 3250. In an embodiment, the controller 3251 may include an SRAM, but the present disclosure is not limited thereto. The controller 3251 may write data to the NAND flash memory device 3252 in response to a write command and/or read data from the NAND flash memory device 3252 in response to a read command. For example, the write command and/or the read command may be provided from the processor 3210 of the storage server 3200, the processor 3210*m* of another storage server 3200*m*, and/or the processors 3110 and 3110*n* of the application servers 3100 and 3100*n*. DRAM 3253 may temporarily store (and/or buffer) data to be written to the NAND flash memory device 3252 and/or data read from the NAND flash memory device 3252. Alternatively or additionally, the DRAM 3253 may store metadata. The metadata may refer to user data and/or data generated by the controller 3251 to manage the NAND flash memory device 3252. In an embodiment, the storage device 3250 may include a secure element (SE) for security and/or privacy.

In an embodiment, at least some of the application servers 3100 and the storage servers 3200 may operate in a manner similar to the system 100 described with reference to FIGS. 1 to 9. For example, the processor 3210 included in the storage server 3200 may use at least a portion of the DRAM 3253 of the storage device 3250 as a dedicated memory. That is, the at least a portion of the DRAM 3253 of the storage device 3250 may be configured to manage and/or store a database or a structured query language (SQL) database in which only a specific field value may be updated by the processor 3210.

Alternatively or additionally, at least a portion of the DRAM 3253 of the storage device 3250 of the storage server 3200 may be directly accessed by other storage servers and/or other application servers. For example, a portion of the DRAM 3253 of the storage device 3250 may be configured to manage and/or store database in which only a specific field value may be updated by the other storage servers and/or the other application servers.

In an embodiment, when the trigger condition has been satisfied (e.g., when the sudden power-off event has been detected), the storage device 3250 of the storage server 3200 may flush the database stored in the at least a portion of the DRAM 3253 to the NAND flash memory 3252. For example, the storage device 3250 may perform the above flush operation through an auxiliary power supply included in the storage device 3250 without assistance of an uninterruptible power supply system (UPS) of the data center 3000 and/or the storage server 3200 (not shown).

According to the present disclosure, a data storage system for automated driving with improved performance and improved reliability when compared to related data storage systems, an operation method of the data storage system for automated driving, and an operation method of a system are provided.

While the present disclosure has been described with reference to embodiments thereof, it is to be apparent to those of ordinary skill in the art that various changes and modifications may be made thereto without departing from the spirit and scope of the present disclosure as set forth in the following claims.

What is claimed is:

1. A data storage system for automated driving, the data storage system comprising:

a non-volatile memory device;

a dedicated memory configured to be accessed based on a memory address that is recognized by an external host as a system memory;

a buffer memory configured to:

temporarily store write data received from the external host; and temporarily store read data read from the non-volatile memory device;

an auxiliary power supply configured to provide an auxiliary power; and a storage controller configured to, under control of the external host:

store user data in the non-volatile memory device; and store sensor data in the dedicated memory in a ring buffer manner, wherein the storage controller is further configured to:

fetch, from a first input/output (I/O) queue of the external host, a first command instructing the storage controller to flush the sensor data, based on a trigger condition not being satisfied, perform at least one of a read operation or a write operation and prevent processing of the first command, and based on the trigger condition being satisfied, process the first command by flushing at least one portion of the sensor data stored in the dedicated memory to the non-volatile memory device by using the auxiliary power and provide the at least one portion of the sensor data stored in the non-volatile memory device to an external-device device, wherein the storage controller includes an input output memory management unit (IOMMU) configured to perform an address mapping such that access to the dedicated memory of the storage controller is performed without communicating with the external host.

2. The data storage system for automated driving of claim 1, wherein the trigger condition comprises at least one of a sudden power-off (SPO) event, a start of an emergency maneuver, involved in a detected collision, an abortion of lane change procedure of an automated driving system, or an event data recorder (EDR) trigger input of the automated driving system.

3. The data storage system for automated driving of claim 1, wherein the sensor data comprises information collected from at least one sensor device of the external host.

4. The data storage system for automated driving of claim 3, wherein the at least one portion of the sensor data flushed from the dedicated memory to the non-volatile memory device corresponds to information for at least 30 seconds immediately prior to the trigger condition being satisfied.

5. The data storage system for automated driving of claim 1, wherein the dedicated memory and the buffer memory are at least one dynamic random access memory (DRAM) device configured to be controlled by the storage controller.

6. The data storage system for automated driving of claim 1, wherein the storage controller is further configured to:

store, in the non-volatile memory device, the user data of the external host by communicating with the external host using a non-volatile memory express (NVMe) interface; and store, in the dedicated memory, the sensor data of the external host, in the ring buffer manner by communicating with the external host using a Compute eXpress Link (CXL) memory protocol.

7. An operation method of a data storage system for automated driving (DSSAD), the operation method comprising:

temporarily storing, in a buffer memory of the data storage system, write data received from an external host or read data read from a non-volatile memory device of the data storage system;

storing, in a dedicated memory of the data storage system, sensor data in a ring buffer manner under control of the external host, the sensor data having been collected from at least one sensor device of the external host;

storing, in the non-volatile memory device of the data storage system, user data under control of the external host;

fetching, from a first input/output (I/O) queue of the external host, a first command instructing to flush the sensor data;

based on a trigger condition not being satisfied, performing at least one of a read operation or a write operation and preventing processing of the first command;

based on the trigger condition being satisfied, processing the first command by flushing, to the non-volatile memory device, at least one portion of the sensor data stored in the dedicated memory; and providing the at least one portion of the sensor data stored in the non-volatile memory device to an external device, wherein the dedicated memory is configured to be accessed based on a memory address managed that is recognized by the external host as a system memory, and wherein the operation method further comprises:

performing an address mapping such that access to the dedicated memory of the data storage system is performed without communicating with the external host.

8. The operation method of claim 7, wherein the trigger condition comprises at least one of a sudden power-off (SPO) event, a start of an emergency maneuver, involved in a detected collision, an abortion of lane change procedure of an automated driving system, or an event data recorder (EDR) trigger input of the automated driving system.

9. The operation method of claim 7, wherein the storing the sensor data in the dedicated memory comprises:

receiving, from the external host, a write request comprising the sensor data;

writing the sensor data to the dedicated memory in response to the write request; and sending a completion response to the external host.

10. The operation method of claim 9, wherein the write request and the completion response comprise signals based on a Compute eXpress Link (CXL) memory protocol of an CXL interface.

11. The operation method of claim 7, wherein the storing the user data in the non-volatile memory device comprises:

fetching an operation command from a submission queue of the external host;

performing an operation corresponding to the operation command;

writing, in a completion queue of the external host, a completion response indicating that the performing the operation corresponding to the operation command has been completed; and sending an interrupt to the external host.

12. The operation method of claim 7, wherein the sensor data flushed from the dedicated memory to the non-volatile memory device corresponds to information for at least 30 seconds immediately prior to the trigger condition being satisfied.

13. The operation method of claim 7, wherein the flushing the at least one portion of the sensor data comprises:

based on the trigger condition being satisfied, flushing, to the non-volatile memory device and using an auxiliary power source of the data storage system, the at least one portion of the sensor data stored in the dedicated memory.

14. An operation method of a system, the operation method comprising:

sending, by a host of the system to a storage device of the system, a write request comprising first data;

storing, by the storage device in response to the write request, the first data in a dedicated memory of the storage device;

sending, by the storage device to the host, a first completion response;

writing, by the host, an operation command in a submission queue of the storage device;

providing, by the host, a doorbell signal to the storage device;

fetching, by the storage device in response to the doorbell signal, the operation command from the submission queue;

performing, by the storage device, an operation corresponding to the operation command, wherein the performing of the operation corresponding to the operation command comprises temporarily storing, in a buffer memory of the storage device, write data received from the host or read data read from a non-volatile memory device of the storage device;

writing, by the storage device in a completion queue of the host, a second completion response indicating completion of the performing the operation;

sending, by the storage device to the host, an interrupt;

processing, by the host in response to the interrupt, the second completion response;

fetching, from a first input/output (I/O) queue of the host, a first command instructing the storage device to flush the first data;

based on a trigger condition not being satisfied, performing at least one of a read operation or a write operation and preventing processing of the first command; and based on the trigger condition being satisfied, storing, by the storage device in response to the first command, the first data stored in the dedicated memory in the non-volatile memory device of the storage device, and providing the first data stored in the non-volatile memory device to an external device, wherein the dedicated memory is configured to be accessed based on a memory address managed that is recognized by the host as a system memory, and wherein the operation method further comprises:

performing an address mapping such that access to the dedicated memory of the storage device is performed without communicating with the host.

15. The operation method of claim 14, wherein:

the first data comprises sensor data that has been collected from at least one sensor device of the host, and the trigger condition comprises at least one of a sudden power-off (SPO) event, cancellation of a lane change procedure of an automated driving system, a start of an emergency maneuver of the automated driving system, or an event data recorder (EDR) trigger input of the automated driving system.

16. The operation method of claim 14, wherein the first data corresponds to a first field value of a structured query language (SQL) database, and the trigger condition comprises a sudden power-off (SPO) event.

17. The operation method of claim 14, wherein the storing the first data stored in the dedicated memory comprises:

storing, by the storage device in response to the first command, the first data stored in the dedicated memory in the non-volatile memory device of the storage device, using an auxiliary power of the storage device, the first data corresponding to a predetermined time duration immediately prior to the trigger condition being satisfied.

* * * * *